United States Patent Office 3,833,608
Patented Sept. 3, 1974

3,833,608
INDOLE-3-METHANESULFONAMIDES
Clarence Stanley Rooney, Beaconsfield, Quebec, and Clarence Henry Gleason, Montreal, Quebec, Canada, assignors to Merck, Sharp & Dohme (I.A.), Rahway, N.J.
No Drawing. Original application Nov. 23, 1970, Ser. No. 92,210, now Patent No. 3,673,186. Divided and this application Sept. 15, 1972, Ser. No. 289,511
Int. Cl. C07d 27/56
U.S. Cl. 260—326.12 R          5 Claims

ABSTRACT OF THE DISCLOSURE

Derivatives of indole-3-acetamide and indole-3-methylsulfonyl compounds are prepared which have utility as skeletal muscle stimulants.

This is a division of application Ser. No. 92,210, filed Nov. 23, 1970, U.S. Pat. 3,673,186. This invention is concerned with novel derivatives of indole that have utility as muscle stimulants. In particular the novel compounds have the following structural formula

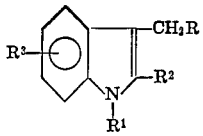

wherein
R represents
  (1) —CONHSO$_2$X, wherein X represents
    (a) lower alkyl of from 1 to about 6 carbon atoms such as methyl, ethyl, propyl, butyl, pentyl and hexyl, either straight or branch chained, and either unsubstituted or substituted with halo such as chloro, bromo, or fluoro, or phenyl,
    (b) phenyl, either unsubstituted or substituted with
      (i) lower alkyl of 1 to about 3 carbons,
      (ii) di(lower alkyl)amino, wherein the lower alkyl groups have from 1 to about 3 carbon atoms,
      (iii) halo, such as chloro, bromo or fluoro,
      (iv) nitro,
      (v) lower alkoxy of from 1 to about 3 carbon atoms, and
      (vi) trifluoromethyl,
    (c) 

wherein R$^4$ and R$^5$ are the same or different and represent hydrogen, lower alkyl of 1 to 3 carbon atoms, phenyl-lower alkyl, or phenyl and when lower alkyl they can be joined together to form a heterocycle of 5–6 members with the nitrogen atom to which they are attached,
  (2) —SO$_2$NH—R$^6$, wherein R$^6$ represents
    (a) hydrogen,
    (b) lower alkyl of from 1 to about 6 carbon atoms,
    (c) —C—R$^7$
         ‖
         O wherein R$^7$ represents
      (i) lower alkyl of 1 to about 3 carbon atoms either unsubstituted or substituted with halogen such as chloro or fluoro,
      (ii) phenyl-lower alkyl, wherein the lower alkyl is of 1 to about 3 carbon atoms,
      (iii) phenyl, (iv) 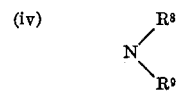

wherein R$^8$ and R$^9$ represent hydrogen, lower alkyl of 1 to about 3 carbon atoms or phenyl-lower alkyl.

(3) 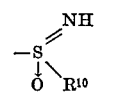

wherein R$^{10}$ represents lower alkyl of 1 to about 3 carbon atoms;

(4) 

wherein R$^{11}$ represents
      (a) lower alkyl of 1 to about 5 carbon atoms either straight or branch chained and either unsubstituted or substituted with such as
        (i) lower alkoxy of 1 to about 3 carbon atoms,
        (ii) phenyl, either unsubstituted or substituted with halo, lower alkyl, or lower alkoxy,
      (b) phenyl, either unsubstituted or substituted with such as
        (i) lower alkyl of 1 to about 3 carbon atoms,
        (ii) lower alkoxy of 1 to about 3 carbon atoms,
        (iii) halo such as chloro, or bromo.
R$^1$ represents
  (1) hydrogen,
  (2) lower alkyl of 1 to about 3 carbons,
  (3) lower alkenyl of from 3 to about 5 carbon atoms, such as allyl, butenyl and the like;
R$^2$ represents lower alkyl of 1 to about 8 carbon atoms, either straight or branch chained and either unsubstituted or substituted with
  (a) lower alkoxy of 1 to about 3 carbons
  (b) lower alkylthio of 1 to about 3 carbons,
  (c) halo, such as chloro, bromo, fluoro, dichloro, trichloro, or trifluoro,
R$^3$ is attached to either the 5- or 6-position of the indole nucleus and represents
  (1) hydrogen,
  (2) lower alkyl of 1 to about 3 carbon atoms
  (3) halo-lower alkyl, such as trifluorolower alkyl wherein the lower alkyl group has from 1 to about 3 carbon atoms,
  (4) halo such as chloro, bromo or fluoro,
  (5) lower alkoxy-lower alkyl wherein the lower alkoxy and lower alkyl groups each has from 1 to about 3 carbon atoms.

The active agents of this invention have been found in standard laboratory animals to produce myotonic symptoms consisting of temporary rigid extension of the legs when the animal is disturbed. The overt appearance is readily distinguishable from convulsions caused by central stimulation. The stimulation of striated muscle is useful in the treatment of disease entities characterized by progressive fatigability of the muscles such as myasthenia gravis.

Treatment with the active agents of this invention can be orally in the form of powders, granules, wafers, tablets, capsules or pills, or by injection intravenously, or intraperitoneally in suspension or in solution. The dose is from 1 to about 50 mg./kg./day either singly or on a multidose regimen depending on the severity of the disorder and the discretion of the physician.

The indole skelleton of the active compounds of this invention is prepared by standard chemical synthetic procedures well known in the art and are represented by the following reaction sequences:

METHOD A

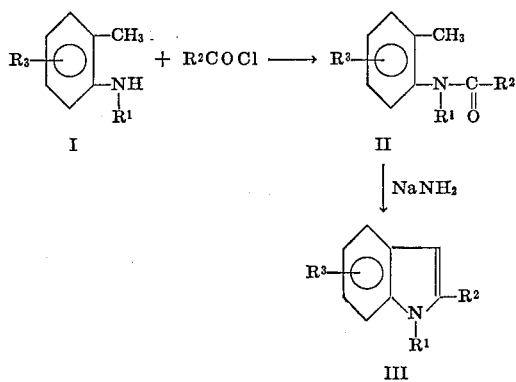

wherein $R^1$, and $R^3$ are as previously defined, and $R^2$ is other than chloro-, bromo-, dichloro- or trichloro-lower alkyl.

When $R^2$ is one of the polyhalogenated alkyls excepted from Method A above an alternate route to compound III is required in as much as the halogen group will not survive the very basic conditions provided by sodamide.

The alternate route to Compound III is represented by the following reaction sequence:

METHOD B

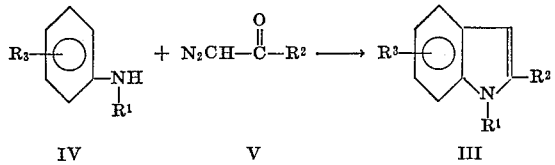

The diazomethyl ketone (V), and an approximately equimolar amount of an acid catalyst such as boron trifluoride etherate or the hydrobromide salt of the aniline (IV) are mixed and an excess of the aniline (IV) is added. The mixture is then heated to 175–200° C. for from 10 minutes to about 5 hours. The cooled mixture is neutralized and the excess aniline reactant is separated by steam distillation or by extraction from ether solution with dilute acid. The product is then isolated by recrystallization from a suitable solvent.

The diazomethylketones are prepared by standard techniques involving the reaction of acid chlorides with diazomethane.

The substituents in the 3-position of the indole structure are introduced by a variety of reactions depending on the nature of the substituent.

The indole acetic acids and intermediates are prepared by known methods in accordance with the following reaction scheme:

METHOD C

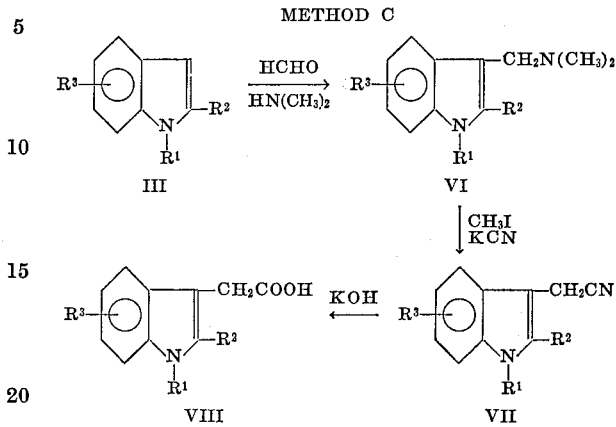

The indole-3-acetic acid derivatives wherein $R^2$ is monohalo-lower alkyl are prepared from Compound VII wherein $R^2$ is benzoyloxy-lower alkyl according to the following reaction:

METHOD D

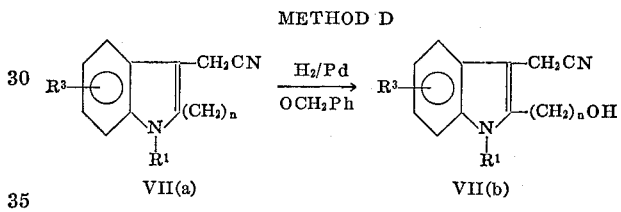

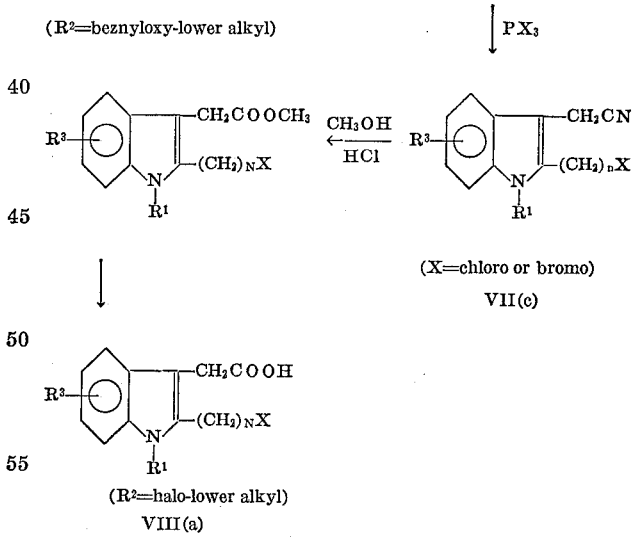

Hydrogenolysis of the benzyl group of Compound VII(a) occurs readily in alcoholic solutions in the presence of a palladium catalyst to yield the corresponding 2-hydroxy-lower alkyl compound VII(b). Halogenation of VII(b) with $PCl_3$ or $PBr_3$ by heating to about 100–150° C. in an inert organic solvent provides the halo-lower alkyl compound, VII(c). Alcoholysis of the nitrile VII(c) to the ester and hydrolysis with dilute hydrochloric acid provides the 2-halo-lower alkylindole-3-acetic acids VIII(a).

The compounds of this invention wherein R is

—$CONHSO_2X$ are prepared by treatment of the acid chloride of an appropriately substituted indoleacetic acid with an alkali metal salt of a sulfonamide of formula $XSO_2NH_2$ as shown by the following reaction scheme:

METHOD E

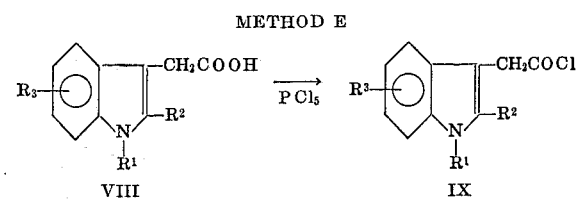

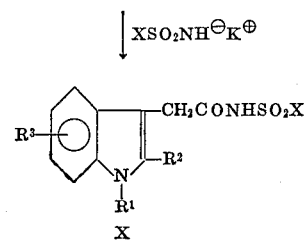

The acid chlorides of the indoleacetic acids are prepared by treatment of the indoleacetic acid in an inert organic solvent such as glyme, (1,2-dimethoxyethane), diglyme, [bis(2-methoxyethyl)ether] or similar ether type solvents, with phosphorus pentachloride preferably at a low temperature i.e., from about $-5$ to about $+10°$ C. and preferably under an inert atmosphere. The acid chloride is not normally isolated as such but treated directly with an alkali metal salt, such as the potassium or sodium salt, of the appropriate sulfonamide preferably in the cold. After warming to room temperature the product is isolated by treatment with water and adjustment of the pH to between about 7 and 3 with a mineral acid such a hydrochloric, sulfuric, or the like. The alkali metal salt of the sulfonamides are prepared by treatment of the sulfonamide in an alcohol with an alkali metal tertiary alkoxide such as potassium t-butoxide.

In those instances wherein X represents

and one or both of $R^4$ and $R^5$ is (are) benzyl, the benzyl group can be readily removed by hydrogenolysis, causing $R^4$ and/or $R^5$ to be hydrogen. Such a synthesis is represented by the following equation:

METHOD F

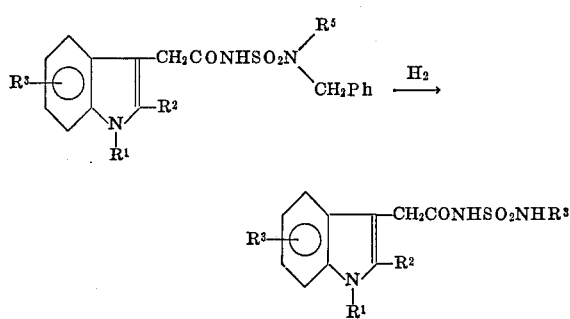

Compounds wherein R is $SO_2NHR_6$ are prepared according to the following scheme:

METHOD G

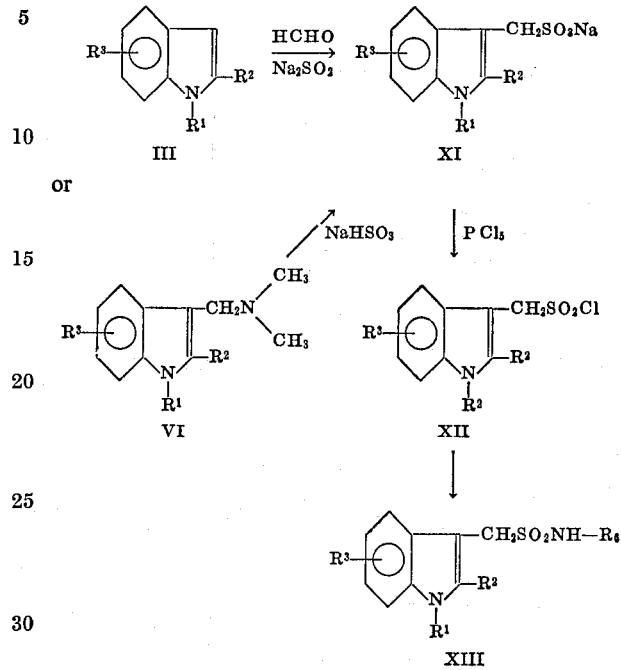

In the preferred method the sodium indolemethanesulfonate is obtained by heating a mixture of an indole, sodium sulfite and formaldehyde in aqueous solution at from about $50°$ C. to reflux for from 10 to 24 hours. The product crystallizes on cooling. This sodium salt is then treated with phosphorus pentachloride in an inert organic solvent such as an ether in the cold. After stirring for 1 to about 5 hours the mixture is treated with an amine of formula $R^6NH_2$ such as ammonia, methylamine or the like. The precipitated product is separated from inorganic materials by recrystallization from benzene.

Where $R^6$ is acyl, i.e.

the indolemethanesulfonamide is acetylated by standard techniques with the appropriate acid chloride or anhydride. The reaction sequence is represented by the following equation:

METHOD H

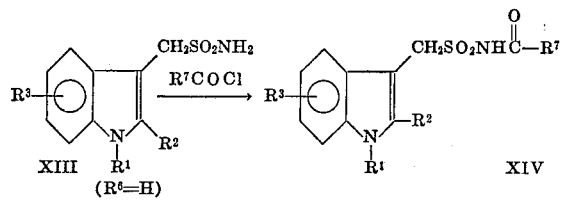

Where $R^6$ represents

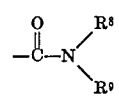

the indolemethanesulfonamide is treated with ethyl chlorocarbonate in refluxing acetone in the presence of an acid acceptor such as potassium carbonate for 12 to 24 hours. The resulting methanesulfonylcarbamate is then treated in the cold in an inert solvent such as glyme with an amine of formula HNR⁸R⁹. The reaction sequence is represented by the following equation:

METHOD J

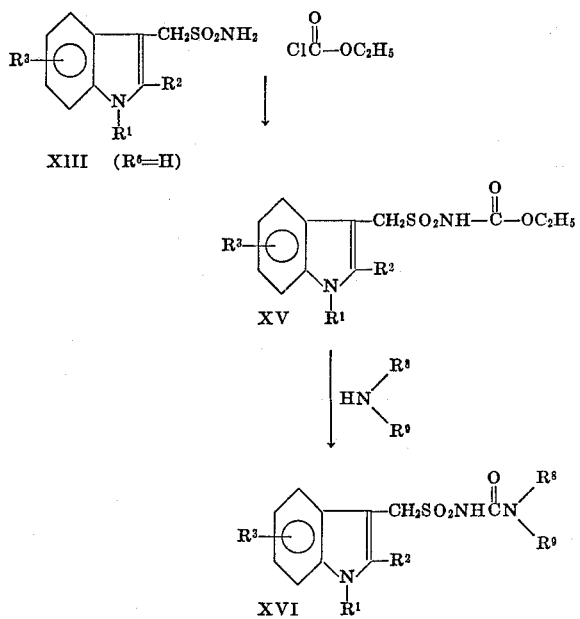

Compounds wherein R represents

are prepared according to the following equation:

METHOD K

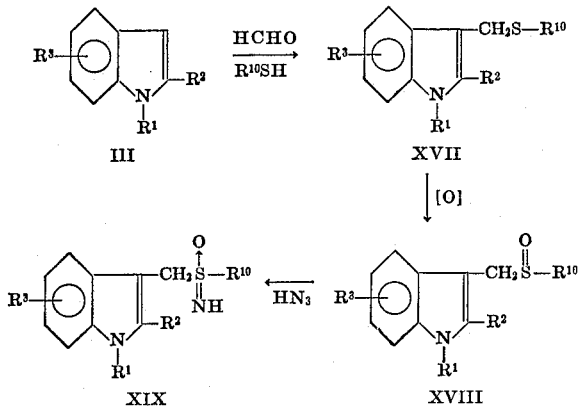

The process for the preparation of these compounds comprises the reaction of an indole with a lower alkanethiol and formaldehyde in an inert solvent such as dioxane for about 10 to 24 hours to yield a lower alkylthiomethyl indole.

Oxidation of this intermediate with a suitable agent such as an alkali metal metaperiodate, lead tetraacetate, or permanganate at a temperature of 5–10° C. for from 10 to 24 hours produces the lower alkylsulfinylmethyl indole intermediate.

The above intermediate is then treated with concentrated sulfuric acid and hydrazoic acid at 40–45° C. After pouring on ice and extracting with an organic solvent, the lower alkylsulfoximinomethylindole is obtained.

Compounds wherein R represents

prepared according to the following equation:

METHOD L

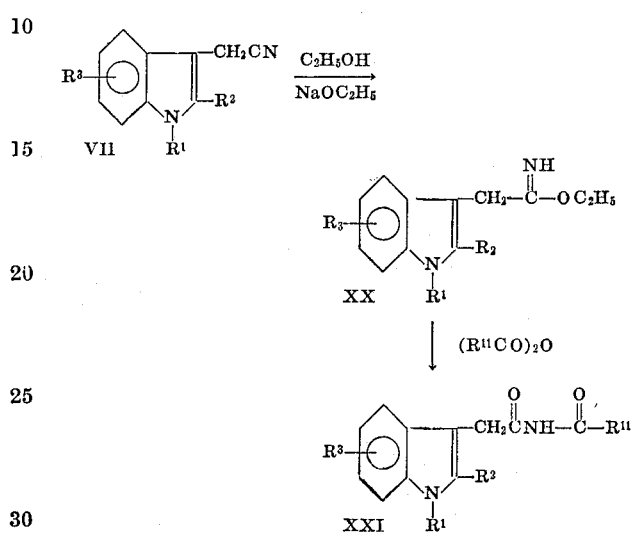

The appropriate indole-3-acetonitrile is treated with an alkali metal such as sodium or potassium in a lower alkanol usually ethanol at temperatures between ambient and the reflux temperature of the lower alkanol, preferably at about 50° C. for from 12 to about 48 hours, 24 hours usually being sufficient. After evaporation of the alkanol solvent, the resulting imino ester residue is slurried in ether or other inert solvent and the mixture is treated with an acid anhydride at ambient temperature or with slight warming for 12 to about 48 hours. The reaction is then quenched by pouring into ice-water and the product is isolated by standard techniques from the organic layer.

EXAMPLE 1

2-Butyl-5-methylindole

Step A: Preparation of N-(2,4-dimethylphenyl)pentanamide.—A solution of 22.7 g. (0.188 mole) of pentanoyl chloride in 100 ml. tetrahydrofuran is added over 20 minutes to a stirred, ice-cooled solution of 121.2 g. (1 mole) 1-amino-2,4-dimethylbenzene. After standing for several hours at room temperature the solvent is removed by distillation *in vacuo*. The residue is taken up in ether and extracted with 12N HCl to remove excess 1-amino-2,4-dimethylbenzene. After washing to neutrality and drying over magnesium sulfate, the ether solution is concentrated to yield 25.1 g. of N-(2,4-dimethylphenyl)pentanamide, m.p. 114–115° C.

Step B: Preparation of 2-Butyl-5-methylindole.—To a stirred solution of 20.5 g. (0.1 mole) of N-(2,4-dimethylphenyl)pentanamide in 250 ml. diethylaniline under nitrogen, is added in portions, 20 g. (0.526 mole) of sodamide. The mixture is heated slowly to 220° C. and maintained at this temperature for 5 hours. The reaction mixture is cooled to about 50° C., and the excess sodamide carefully decomposed by the addition of 300 ml. of water. The organic phase is extracted into 300 ml. ether and washed with portions of cold 4N HCl and water. The ether solution is dried and concentrated to 20.2 g. of residual solid. Recrystallization from petroleum ether gives 2-butyl-5-methylindole, m.p. 73.5–75.5° C.

Employing the procedure of Example I, but substituting for the pentanoyl chloride and the 2,4-dimethylaniline used therein equivalent amounts of an acid chloride of formula R²COCl and an aniline of structure

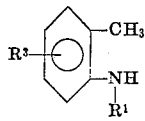

described in Table I there are produced the 1-R¹-2-R²-R³-indoles also described in Table I.

TABLE I

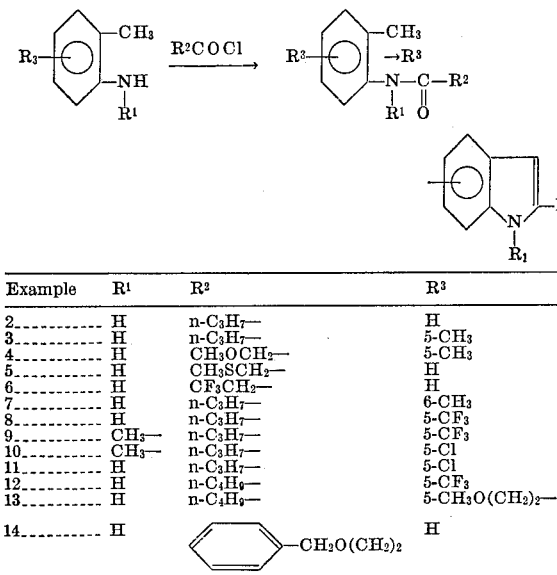

| Example | R¹ | R² | R³ |
|---|---|---|---|
| 2 | H | n-C₃H₇— | H |
| 3 | H | n-C₃H₇— | 5-CH₃ |
| 4 | H | CH₃OCH₂— | 5-CH₃ |
| 5 | H | CH₃SCH₂— | H |
| 6 | H | CF₃CH₂— | H |
| 7 | H | n-C₃H₇— | 6-CH₃ |
| 8 | H | n-C₃H₇— | 5-CF₃ |
| 9 | CH₃— | n-C₃H₇— | 5-CF₃ |
| 10 | CH₃— | n-C₃H₇— | 5-Cl |
| 11 | H | n-C₃H₇— | 5-Cl |
| 12 | H | n-C₄H₉— | 5-CF₃ |
| 13 | H | n-C₄H₉— | 5-CH₃O(CH₂)₂— |
| 14 | H | 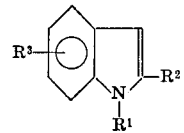—CH₂O(CH₂)₂ | H |

EXAMPLE 15

2-(2,2-dichloroethyl)indole

Step A: Preparation of diazomethyl 2,2-dichloroethyl ketone.—A solution of 3,3-dichloropropionyl chloride (1.5 g., 0.01 mole) in ether 25 ml. is added dropwise to a rapidly stirred solution of diazomethane (0.03 mole) in 25 ml. ether at 0–5° C. The crude product is obtained by evaporation of the solvent and excess diazomethane and used directly in the next step.
(dimethylaminomethyl)-5-methyl-2-butylindole dissolved mixture of 1.0 g. of diazomethyl 2,2-dichloroethyl ketone, 1 g. of boron trifluoride etherate and 15 ml. of freshly distilled aniline is heated under reflux at 180° for 10 minutes. The cooled reaction mixture is treated with an excess of sodium carbonate solution and steam distilled to remove the aniline. The solid residue is collected and recrystallized from benzene-petroleum ether.

EXAMPLE 16

2-(2,2,2-Trichloroethyl)indole

Employing the procedure of Example 15, but substituting for the 3,3-dichloropropionyl chloride used therein an equivalent amount of 3,3,3-trichloropropionyl chloride, there is produced 2-(2,2,2-trichloroethyl)indole.

EXAMPLE 17

2-Butyl-5-methylindole-3-acetic acid

Step A: Preparation of 3-(Dimethylaminomethyl)-2-butyl-5-methylindole.—A solution of 6.087 g. (0.0325 mole) of 2-butyl-5-methylindole in 32.5 ml. dioxane is added dropwise to a stirred solution of 3.25 g. of formaldehyde (25% aqueous), 7.15 ml. of dimethylamine (37% aqueous), 32.5 ml. of glacial acetic acid, and 32.5 ml. of dioxane at a temperature maintained below 0° C. After the addition is complete, the reaction mixture is allowed to warm to room temperature over a period of 18 hours. It is diluted with 300 ml. water and filtered to remove a small amount of gummy by-product. The filtrate is chilled in an ice-bath and made basic (pH 10–11) with 10N KOH. The precipitated product is filtered, washed with water and dried. Recrystallization from n-hexane gives 5.0 g. (63.3%) of 3-(dimethylaminomethyl)-2-butyl-5-methylindole, m.p. 108.5–110.5° C.

Step B: Preparation of 2-Butyl-3-(cyanomethyl)-5-methyl-indole.—A solution of 3.42 g. (0.014 mole) of 3-(dimethylaminomethyl)-5-methyl-2-butylindole dissolved in 60 ml. dry ether is added dropwise with stirring to an ice-cooled solution of 19.5 ml. of iodomethane and stirred for 6 hours at 0° C. The precipitate is filtered, washed with ether and dried to yield 4.7 g. (87%) of the methiodide salt of 3-(dimethylaminomethyl)-5-methyl-2-butylindole.

Without further purification, the methiodide is added to a solution of 8.93 g. potassium cyanide in 68.3 ml. of water and maintained at 80° C. with stirring for 2 hours. After cooling, the reaction mixture is extracted with ether, the ether solution is washed with water, dried over magnesium sulfate and evaporated to a residual yellow oil, 2.9 g. (90%) of 2-butyl-3-(cyanomethyl)-5-methylindole.

Step C: Preparation of 2-Butyl-5-methylindole-3-acetic acid.—The nitrile 2.9 g. (0.0128 mole), is added to a solution of 11.53 g. (0.205 mole) potassium hydroxide in 39 ml. of water and 64 ml. ethanol and refluxed for 16 hours under a blanket of nitrogen. The reaction mixture is diluted with 500 ml. water, acidified to pH 2 with concentrated hydrochloric acid and extracted with ether. The ether extract is washed with water, dried over magnesium sulfate and evaporated to a crystalline residue, 3.1 g. (90%). Recrystallization from petroleum ether yields 2-butyl-5-methylindole-3-acetic acid, m.p. 106–110° C.

Employing the procedure of Example 17 as depicted by Method C, but substituting for the 2-butyl-5-methylindole used therein equivalent quantities of an indole of formula there are produced the substituted indoleacetic acids described in Table II.

TABLE II

| Example | R¹ | R² | R³ |
|---|---|---|---|
| 18 | H | n-C₃H₇ | H |
| 19 | H | n-C₃H₇ | 5-CH₃ |
| 20 | H | CH₃O(CH₂)— | 5-CH₃ |
| 21 | H | Cl₂CHCH₂— | H |
| 22 | H | CH₃S(CH₂)— | H |
| 23 | H | Cl₃CCH₂— | H |
| 24 | H | CF₃CH₂— | H |
| 25 | H | n-C₃H₇ | 6-CH₃ |
| 26 | H | n-C₃H₇ | 5-CF₃ |
| 27 | CH₃— | n-C₃H₇ | 5-CF₃ |
| 28 | CH₃— | n-C₃H₇ | H |
| 29 | H | n-C₃H₇ | 5-Cl |
| 30 | H | n-C₄H₉ | 5-CF₃ |
| 31 | H | n-C₄H₉ | 5-CH₃O(CH₂)₂ |
| 32 | H | 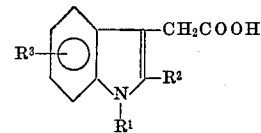—CH₂O(CH₂)₂— | H |

EXAMPLE 33

2-(2-Chloroethyl)indole-3-acetic acid

Step A: Preparation of 2 - (2-hydroxyethyl)indole-3-acetonitrile.—A solution of 2-(2-benzyloxyethyl)indole-3-acetonitrile (1.0 g.) obtained as an intermediate in the synthesis of the compound of Example 32 in 35 ml. of ethanol is hydrogenated in the presence of a catalytic amount of 5% palladium on carbon. After separation of the catalyst by filtration, the filtrate is concentrated to dryness, and the residue of 2-(2-hydroxyethyl)indole-3-acetonitrile is collected and used directly in the next step.

Step B: Preparation of 2-(2-chloroethyl)indole-3-acetonitrile.—2-(2-Hydroxyethyl)indole - 3 - acetonitrile (200 mg.), phosphorus trichloride (250 mg.) and 10 ml. of toluene are heated at reflux under nitrogen for 18 hours. The mixture is evaporated and the residue mixed with ice water and sodium carbonate. Extraction with chloroform provides the product, 2-(2 - chloroethyl)indole-3-acetonitrile.

Step C: Preparation of methyl 2-(2-chloroethyl)indole-3-acetate.—An ice cold solution of 2-(2-chloroethyl)indole-3-acetonitrile (220 mg.) in 5 ml. of methanol containing 0.05 ml. of water is saturated with hydrogen chloride gas. After stirring at room temperature for 48 hours the solution is evaporated to dryness, and the residue treated with sodium bicarbonate solution and then extracted with methylene chloride. Purification by chromatography on alumina yields methyl 2-(2-chloroethyl)indole-3-acetate.

Step D: Preparation of 2-(2-chloroethyl)indole-3-acetic acid.—Methyl 2-(2-chloroethyl)indole - 3 - acetate (100 mg.) is hydrolyzed by refluxing in a mixture of 20 ml. benzene-10 ml. 10% hydrochloric acid for 3 hours. After cooling, the benzene layer is evaporated to dryness to yield 2-(2-chloroethyl)indole-3-acetic acid.

EXAMPLE 34

2-(2-Bromoethyl)indole-3-acetic acid

Employing the process of Example 33 but substituting for the phosphorus trichloride used therein an equivalent amount of phosphorus tribromide, there is produced 2-(2-bromoethyl)indole-3-acetic acid.

EXAMPLE 35

N-(Methanesulfonyl)-5-methyl-2-propylindole-3-acetamide

Step A: Preparation of Potassium Methansulfonamide.—A solution of 20.9 g. (0.22 mole) of methanesulfonamide and potassium t-butoxide (24.68 g., 0.22 mole) in 450 ml. methanol is stirred for 2 hours at room temperature. The reaction mixture is then distilled to dryness and dried in high vacuum overnight.

Step B: Preparation of Acid Chloride of 5-methyl-2-propylindole-3-acetic acid.—To a solution of 8.096 g. (0.035 mole) of 5-methyl-2-propyl-indole-3-acetic acid in dry glyme chilled to 0 to —5° C. under nitrogen, is added 7.291 g. (0.035 mole) of phosphorus pentachloride. The mixture is stirred for 2 hours by which time solution is complete.

Step C: N-(Methanesulfonyl)-5-methyl-2-propylindole-3-acetamide.—The above solution of the acid chloride is added to the potassium salt of methanesulfonamide from Step A and the reaction mixture allowed to warm to room temperature and stirred for 2 hours. Five hundred ml. of water is then added to the reaction mixture and the pH is adjusted to approximately 5 with dilute hydrochloric acid. The gummy solid which precipitates is extracted with ether, the ether extract washed with water, dried over magnesium sulfate, treated with charcoal and concentrated to a yellow oil which, on recrystallization from ether-petroleum ether yields 4 grams of product, m.p. 159–159.5 C.

Employing the procedure of Example 35, the amide derivatives listed in Table III were prepared by substituting for the methane sulfonamide and 5-methyl-2-propylindole-3-acetic acid of Example 35, equivalent amounts of a reagent of formula $NH_2SO_2X$ and 5-(or 6)-$R^3$-2-$R^2$-indole-3-acetic acid respectively.

TABLE III

| Example | $R^2$ | $R^3$ | X | M.P. (° C.) |
|---|---|---|---|---|
| 36 | n-$C_3H_7$ | H | —N($CH_3$)$_2$ | 139–144.5 |
| 37 | n-$C_3H_7$ | H | —$CH_3$ | 147–148 |
| 38 | n-$C_3H_7$ | H | —C$_6$H$_4$—$CH_3$ | 188–211 |
| 39 | n-$C_3H_7$ | 5-$CH_3$ | —$CHF_2$ | ——— |
| 40 | $CH_3O(CH_2)$— | 5-$CH_3$ | —C$_6$H$_5$ | ——— |
| 41 | n-$C_3H_7$ | 5-$CH_3$ | —$CH_2$—C$_6$H$_5$ | ——— |
| 42 | $Cl_2CHCH_2$— | H | —C$_6$H$_4$—N($CH_3$)$_2$ | ——— |
| 43 | $CH_3S(CH_2)$— | H | —C$_6$H$_4$—Cl | ——— |
| 44 | $Cl(CH_2)_2$— | H | —C$_6$H$_4$—F | ——— |
| 45 | $Br(CH_2)_2$— | H | —C$_6$H$_4$—$NO_2$ | ——— |
| 46 | $Cl_3CCH_2$— | H | —C$_6$H$_4$—$OC_2H_5$ | ——— |
| 47 | $CF_3CH_2$— | H | —C$_6$H$_4$—$CH_3$ | ——— |
| 48 | n-$C_3H_7$ | 5-$CH_3$ | —($CH_3$)(CH$_2$—C$_6$H$_5$) | ——— |
| 49 | n-$C_3H_7$ | 5-$CH_3$ | —N(CH$_2$)$_5$ | ——— |

EXAMPLE 50

N-(Methylsulfamyl)-5-methyl-2-propylindole-3-acetamide

A solution of N - (methyl-benzylsulfamyl)-5-methyl-2-propylindole-3-acetamide (4.13 g., 0.01 mole) from Example 48 in 50 ml. of ethanol is hydrogenated over 10% palladium on carbon in a Parr hydrogenation apparatus at an initial pressure of 50 p.s.i.g. After separation of the catalyst by filtration, the filtrate is concentrated to dryness and the residue is recrystallized from benzene to give N - (methylsulfamyl - 5 - methyl-2-propylindole-3-acetamide.

EXAMPLE 51

5-Methyl-2-propylindole-3-methanesulfonamide

Step A: Preparation of sodium 5-methyl-2-propylindole - 3 - methanesulfonate.—5 - Methyl-2-propylindole (17.3 g., 0.1 mole) and sodium sulfite (50.4 g., 0.4 mole) are suspended in water (250 ml) and heated to gentle reflux with stirring. Aqueous formaldehyde (25 ml. 36.2%, 0.3 mole) is added and the mixture is refluxed for 18 hours. The reaction mixture is cooled and the product that crystallizes is collected by filtration and recrystallized from aqueous sodium bromide solution to give sodium 5-methyl-2-propylindole-3-methanesulfonate.

Step B: Preparation of 5 - methyl - 2-propylindole-3-methane sulfonamide.—To a suspension of sodium 5-methyl-2-propylindole-3-methane sulfonate (14.5 g., 0.05 mole) in ethyl ether (250 ml.) at 0–5° C. is added phosphorus pentachloride (10.4 g., 0.05 mole) and the mixture is stirred for 2 hours. Maintaining the temperature of the reaction mixture at 0–5° C. ammonia gas (0.1 mole is bubbled slowly into it. The precipitate consisting of sodium chloride, ammonium chloride and product is extracted several times with benzene. The extracts are concentrated to incipient cloudiness and then cooled to precipitate 5 - methyl - 2-propylindole-3-methanesulfonamide.

Employing the procedure of Example 51 but substituting for the 5-methyl-2-propylindole used in Step A and the ammonia used in Step B, equivalent amounts of 1-$R^1$-2-$R^2$-5(or 6)-$R^3$-indole and an amine of formula $R^6NH_2$ respectively identified in Table IV, there are produced the N - $R^6$ - 1-$R^1$-2-$R^2$-5(or 6)-indole-3-methanesulfonamides also identified in Table IV.

TABLE IV

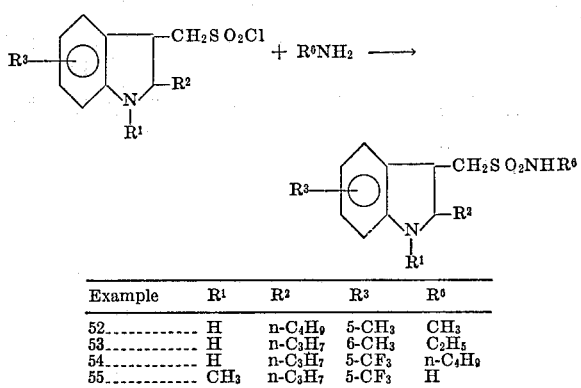

| Example | $R^1$ | $R^2$ | $R^3$ | $R^6$ |
|---------|-------|-------|-------|-------|
| 52 | H | n-$C_4H_9$ | 5-$CH_3$ | $CH_3$ |
| 53 | H | n-$C_3H_7$ | 6-$CH_3$ | $C_2H_5$ |
| 54 | H | n-$C_3H_7$ | 5-$CF_3$ | n-$C_4H_9$ |
| 55 | $CH_3$ | n-$C_3H_7$ | 5-$CF_3$ | H |

EXAMPLE 56

5-Methyl-2-propylindole-3-methanesulfonacetamide

5 - Methyl-2-propylindole-3-methanesulfonamide (13.3 g., 0.05 mole) from Example 51 is refluxed in acetyl chloride (35 ml.) for one hour. The excess acetyl chloride is removed by distillation in vacuo. The residue is treated with a large excess of water and the solid residue is collected and dissolved in warm sodium bicarbonate solution. Acidification of the filtered solution with acetic acid causes precipitation of 5-methyl-2-propylindole-3-methanesulfonacetamide which is purified by recrystallization from aqueous ethanol.

Employing the process of Example 56 but substituting for the 5 - methyl-2-propylindole-3-methanesulfonamide and the acetyl chloride utilized therein equivalent amounts of the 1-$R^1$-2-$R^2$-5(or 6)-$R^3$-indole-3-methanesulfonamides and acyl chlorides of formula $R^7COCl$ described in Table V, there are produced the 1-$R^1$-2-$R^2$-5(or 6)-$R^3$-indole-3-methanesulfonacylamides also described in Table V.

TABLE V

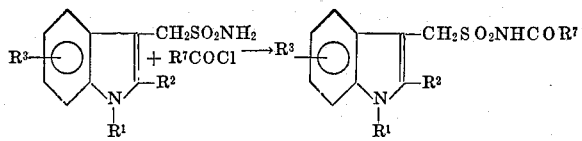

| Example | $R^1$ | $R^2$ | $R^3$ | $R^7$ |
|---------|-------|-------|-------|-------|
| 57 | $CH_3$ | n-$C_3H_7$ | 5-$CF_3$ | —$CH_2$—⌬ |
| 58 | $CH_3$ | n-$C_4H_9$ | 5-$NO_2$ | —⌬ |
| 59 | H | n-$C_3H_7$ | 5-$CH_3$ | —$CH_2CH_2$—⌬ |
| 60 | H | n-$C_3H_7$ | 5-$CH_3$ | —$C_3H_7$ |
| 61 | $CH_3$ | n-$C_3H_7$ | 5-$CF_3$ | —$CHCl_2$ |
| 62 | H | n-$C_3H_7$ | 5-$CH_3$ | —$CHF_2$ |
| 63 | H | n-$C_3H_7$ | 5-$CH_3$ | —$CF_3$ |

EXAMPLE 64

N-(5-Methyl-2-propylindole-3-methanesulfonyl)-N',N'-dimethylurea

Ethylchlorocarbonate (7.2 g., 0.066 mole) is added with stirring over a period of 3 hours to a mixture of 5-methyl-2-propylindole-3-methanesulfonamide (13.3 g., 0.05 mole) and anhydrous potassium carbonate in acetone (60 ml.). The mixture is stirred and refluxed for 18 hours, cooled and filtered. The solid residue is dissolved in water (150 ml.), filtered, and acidified with concentrated hydrochloric acid to congo red which precipitates crude N-(5-methyl - 2 - propylindole-3-methanesulfonyl)ethyl carbamate intermediate. The precipitate is collected on a filter, washed and dried. The sulfonylcarbamate (16.9 g. 0.05 mole) is suspended in glyme (200 ml.), cooled to 0–5° C., and treated with dimethylamine (6.75 g., 0.15 mole). After warming to ambient temperature spontaneously, the solvent and excess amine are evaporated under reduced pressure and the residue is heated at 110–120° C. at 5 mm. Hg for 6 hours. The residue is recrystallized from aqueous ethanol to give N-(5-methyl - 2 - propylindole-3-methanesulfonyl)-N',N'-dimethylurea.

Employing the procedure of Example 64, but substituting for the 5-methyl-2-propylindole-3-methanesulfonamide and the dimethylamine utilized therein equivalent amounts of the 5(or 6)-$R^3$-2-$R^2$-indole-3-methanesulfonamides and the amines described in Table VI, there are produced the 5(or 6)-$R^3$-2-$R^2$-indole-3-methanesulfonylureas also depicted in Table VI.

TABLE VI

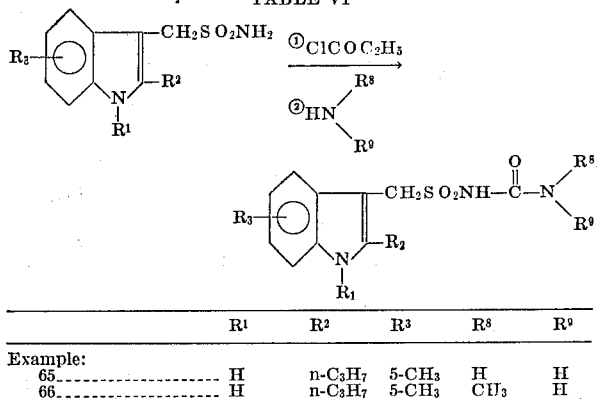

| Example: | R¹ | R² | R³ | R⁸ | R⁹ |
|---|---|---|---|---|---|
| 65 | H | n-C₃H₇ | 5-CH₃ | H | H |
| 66 | H | n-C₃H₇ | 5-CH₃ | CH₃ | H |
| 67 | CH₃ | n-C₃H₇ | 5-CF₃ | C₂H₅ | CH₃ |

EXAMPLE 68

5-Methyl-2-propyl-3-methylsulfoximinomethylindole

Step A: Preparation of 5-methyl-2-propyl-3-methylthiomethylindole.—A solution of 5-methyl-2-propylindole (17.3 g., 0.1 mole) in dioxane (100 ml.) is added dropwise with stirring to a solution of formaldehyde (25 ml., 25% aqueous) and methanethiol (10 g.) in dioxane (100 ml.) at 0–5° C. After addition is complete the reaction mixture is allowed to warm to ambient temperature over a period of 18 hours. Volatile materials are distilled in vacuo, and the residue is taken up in chloroform. After washing with water and drying over magnesium sulfate, the chloroform solution is concentrated to a small volume and the solid residue of 5-methyl-2-propyl-3-methylthiomethylindole is collected by filtration.

Step B: Preparation of 5-methyl-2-propyl-3-methylsulfinylmethylindole.—5-Methyl - 2 - propyl-3-methylthiomethylindole (23.3 g., 0.1 mole) from Step A is added to a 0.5 M solution of sodium metaperiodate (210 ml., 0.105 mole) at 0° C. The mixture is stirred at ice-bath temperature overnight. The precipitated sodium iodate is separated by filtration and the filtrate is extracted with chloroform. The extract is dried over magnesium sulfate and concentrated to dryness. The residue is recrystallized from acetone-ether to give 5-methyl-2-propyl-3-methylsulfinylmethylindole.

Step C: Preparation of 5-methyl - 2 - propyl-3-methylsulfoximinomethylindole.—5-Methyl - 2 - propyl-3-methylsulfinylmethylindole (2.5 g., 0.01 mole) from Step B, is dissolved in 10 ml. of chloroform and to the solution is added concentrated sulfuric acid (2.5 ml.). The mixture is warmed to 43° C., and hydrazoic acid (0.02 mole) in 10 ml. of chloroform is added dropwise over a period of 3 hours, and stirring is continued at this temperature for an additional 2 hours. The reaction mixture is poured into ice-water. The chloroform layer is separated. The aqueous layer is neutralized with aqueous sodium hydroxide solution and extracted with chloroform. The combined chloroform extracts are dried over magnesium sulfate and concentrated to dryness. The residue is recrystallized from low-boiling petroleum ether to give 5-methyl-2-propyl-3-methylsulfoximinomethylindole.

Employing the procedure of Example 68 but substituting for the 5-methyl-2-propylindole and methanethiol utilized therein, equivalent amounts of the 1-R¹-2-R²-5(or 6)-R³-indoles and thiols of formula R¹⁰SH, described in Table VII there are produced the 1-R¹-2-R²-5(or 6)-R³-3-R¹⁰-sulfoximinomethylindoles also described in Table VII.

TABLE VII

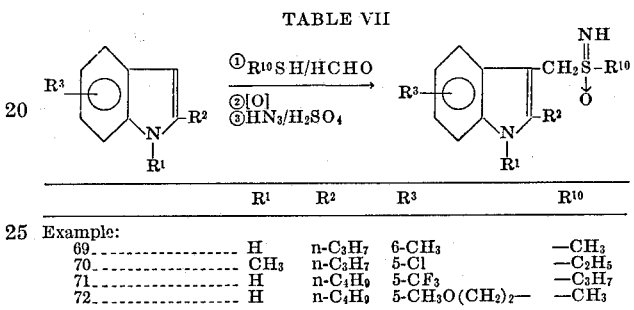

| Example: | R¹ | R² | R³ | R¹⁰ |
|---|---|---|---|---|
| 69 | H | n-C₃H₇ | 6-CH₃ | —CH₃ |
| 70 | CH₃ | n-C₃H₇ | 5-Cl | —C₂H₅ |
| 71 | H | n-C₄H₉ | 5-CF₃ | —C₃H₇ |
| 72 | H | n-C₄H₉ | 5-CH₃O(CH₂)₂— | —CH₃ |

EXAMPLE 73

5-Methyl-2-propylindole-3-N-acetylacetamide

5-Methyl - 2 - propylindole-3-acetonitrile (2.12 gms.) in absolute ethanol (10 mls.) is added to sodium metal (.046 gms.) in absolute ethanol (50 mls.). The reaction is warmed to 50° C. for 24 hours. When reaction is complete, the ethanol is evaporated in vacuo leaving a mixture of the imino ester and sodium ethoxide. To this residual mixture is added absolute ether (50 mls.), then acetic anhydride (3 mls.), and then the reaction is stirred at room temperature for 24 hours. The reaction mixture is poured onto ice-water, stirred for 4 hours, and the ether layer is then separated, washed with bicarbonate, dried, and evaporated in vacuo. The 5-methyl-2-propylindole-3-N-acetylacetamide is obtained by recrystallization from ethanol.

Employing substantially the procedure of Example 73 but substituting for the 5-methyl-2-propylindole-3-acetonitrile and the acetic anhydride used therein the 1-R¹-2-R²-5(or 6)-R³-indole-3-acetonitriles and acid anhydrides of formula (R¹¹CO)₂O described in Table VIII, there are produced the 1-R¹-2-R²-5(or 6)-R³-indole-3-N-acetylacetamides also described in Table VIII.

TABLE VIII

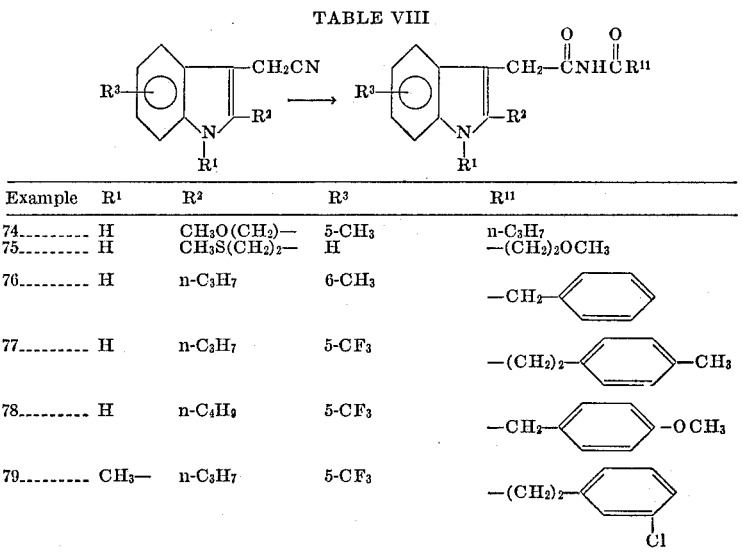

| Example | R¹ | R² | R³ | R¹¹ |
|---|---|---|---|---|
| 74 | H | CH₃O(CH₂)— | 5-CH₃ | n-C₃H₇ |
| 75 | H | CH₃S(CH₂)₂— | H | —(CH₂)₂OCH₃ |
| 76 | H | n-C₃H₇ | 6-CH₃ | —CH₂—⟨phenyl⟩ |
| 77 | H | n-C₃H₇ | 5-CF₃ | —(CH₂)₂—⟨phenyl⟩—CH₃ |
| 78 | H | n-C₄H₉ | 5-CF₃ | —CH₂—⟨phenyl⟩—OCH₃ |
| 79 | CH₃— | n-C₃H₇ | 5-CF₃ | —(CH₂)₂—⟨phenyl⟩—Cl |

TABLE VIII—Continued

| Example | R¹ | R² | R³ | R¹¹ |
|---|---|---|---|---|
| 80 | H | n-C₃H₇ | H | –phenyl |
| 81 | H | n-C₃H₇ | 5-Cl | –C₆H₄–CH₃ |
| 82 | H | n-C₄H₉ | 5-CH₃O(CH₂)₂ | –C₆H₄–OC₂H₅ |
| 83 | H | n-C₃H₇ | H | –C₆H₄–Cl |

The amount of muscle stimulant agent to be employed will depend upon the age, condition, weight, and other factors relevant to the animal to be treated and necessarily needs to be individualized by the physician or veterinarian for each patient. A suitable unit dosage form for oral administration is described in the following example.

EXAMPLE 84

Capsules containing 25 mgs. of active ingredient

|  | Mg. |
|---|---|
| N-(Methanesulfonyl) - 5 - methyl-2-propyl-indole-3-acetamide | 25 |
| Corn starch U.S.P. | 10 |
| Lactose U.S.P. | 130 |

What is claimed is:

1. A compound of the structural formula

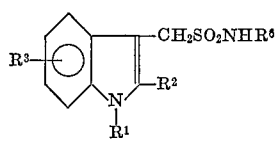

wherein
$R^1$ is a member selected from the group consisting of
(a) hydrogen, and
(b) lower alkyl;
$R^2$ is a member selected from the group consisting of
(a) lower alkyl,
(b) lower alkoxy-lower alkyl,
(c) lower alkythio-lower alkyl, and
(d) halo-lower alkyl;
$R^3$ is a member selected from the group consisting of
(a) hydrogen,
(b) lower alkyl,
(c) halo-lower alkyl,
(d) halo, and
(e) lower alkoxy-lower alkyl; and
$R^6$ is a member selected from the group consisting of
hydrogen,
loweralkyl, and
acyl of the formula

wherein
$R^7$ is a member selected from the group consisting of
(a) lower alkyl,
(b) halo-lower alkyl,
(c) phenyl-lower alkyl,
(d) phenyl,
(e)

wherein $R^8$ and $R^9$ are members selected from the group consisting of (i) hydrogen, (ii) lower alkyl, and (iii) phenyl-lower alkyl.

2. The compound of Claim 1 wherein $R^6$ is hydrogen.
3. The compound of Claim 1 wherein $R^2$ and $R^3$ are loweralkyl, and $R^6$ is hydrogen.
4. The compound of Claim 1 wherein $R^6$ is loweralkyl.
5. The compound of Claim 1 wherein $R^2$, $R^3$ and $R^6$ are loweralkyl.

References Cited
UNITED STATES PATENTS
3,297,717   1/1967   Gould et al. _____ 260—326.12 R JOSEPH A. NARCAVAGE, Primary Examiner